(Model.)

2 Sheets—Sheet 1.

J. B. ODELL.
MOLD.

No. 333,661.        Patented Jan. 5, 1886.

Witnesses:
Chas. E. Gaylord
I. A. Lorenz Gage

Inventor:
John B. Odell (Model.) 2 Sheets—Sheet 2.
J. B. ODELL.
MOLD.
No. 333,661. Patented Jan. 5, 1886.
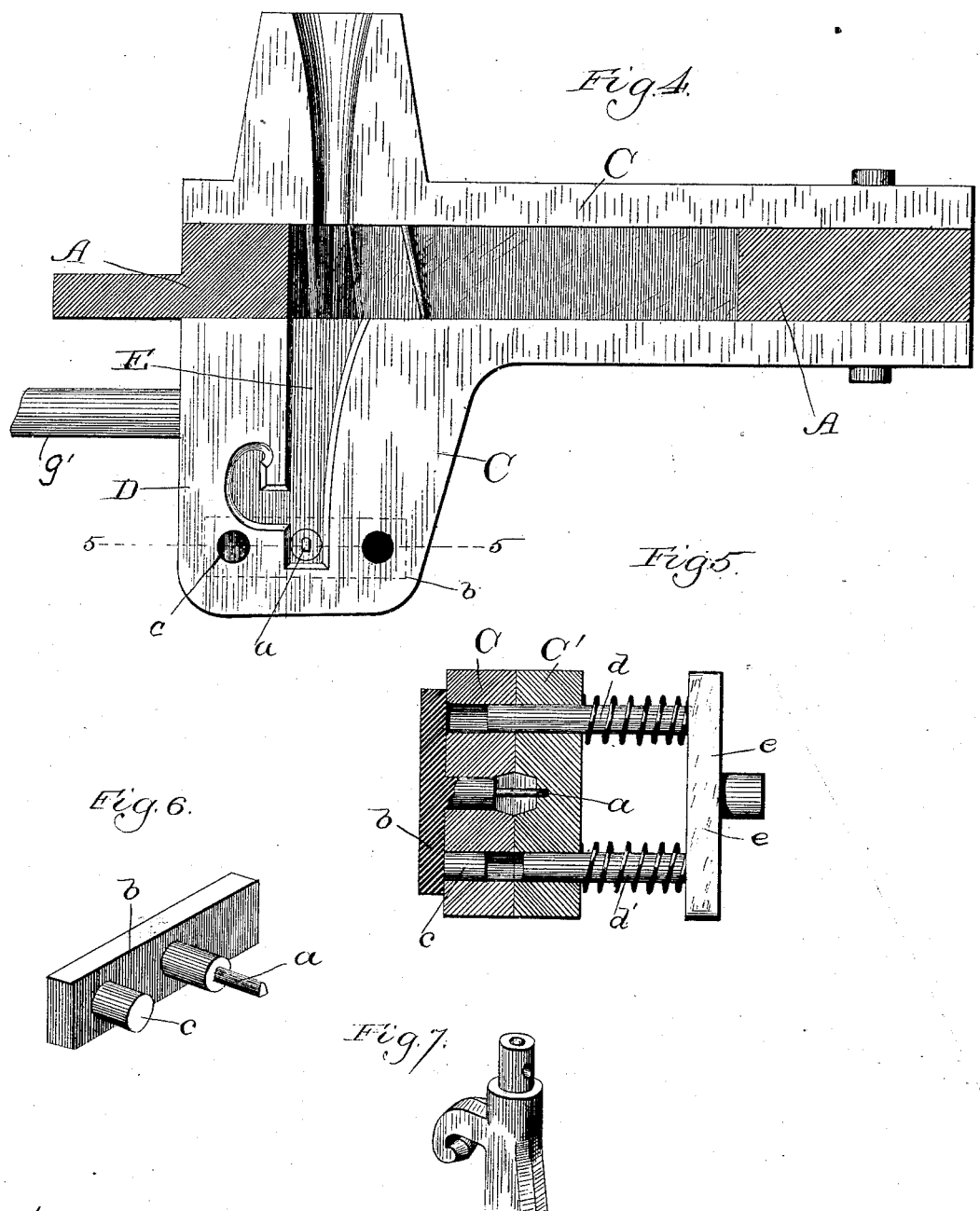
Witnesses:
Chas. E. Gaylord
Inventor:
John B. Odell

UNITED STATES PATENT OFFICE.

JOHN B. ODELL, OF CHICAGO, ILLINOIS.

MOLD.

SPECIFICATION forming part of Letters Patent No. 333,661, dated January 5, 1886.

Application filed June 26, 1884. Serial No. 136,073. (Model.)

*To all whom it may concern:*

Be it known that I, JOHN B. ODELL, residing at Chicago, in Cook county, in the State of Illinois, a citizen of the United States, have invented a new and useful Improvement in Molds for Casting Metals, of which the following is a specification.

Figure 1:
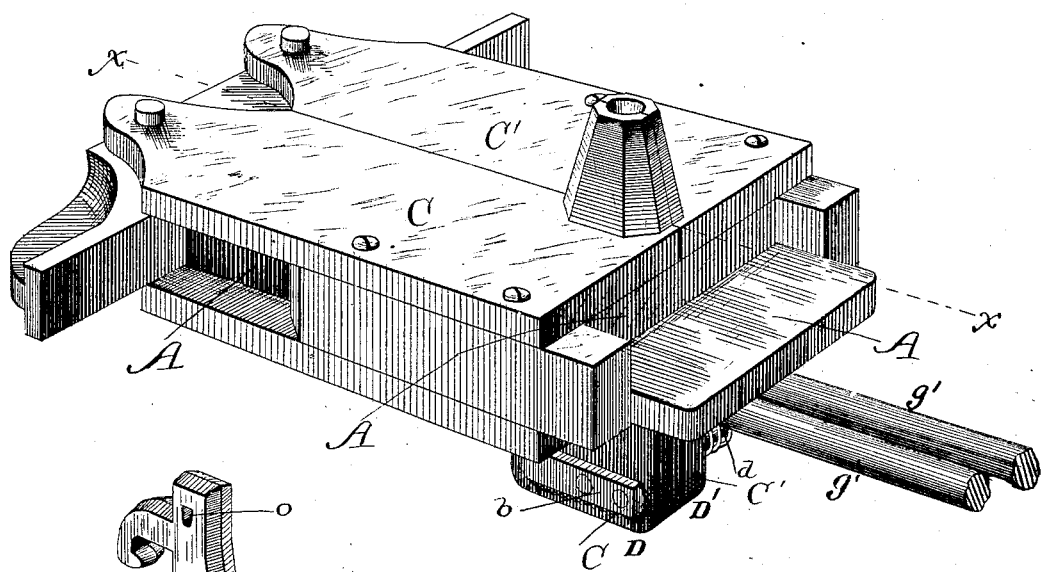
Figure 2:
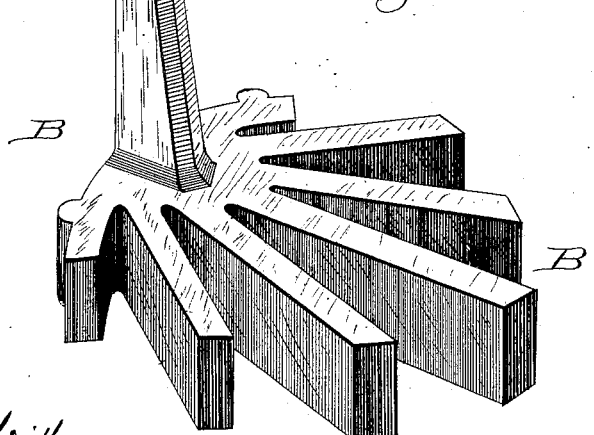
Figure 3:
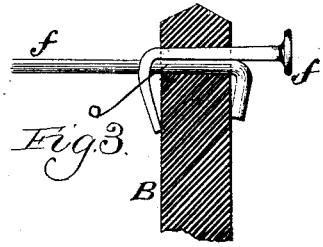

Figure 1 is a perspective view of a mold closed to receive the zinc. Fig. 2 is a perspective view of an electrode. Fig. 3 is a top of the electrode, showing the wire and its connections. Fig. 4 is a sectional view of the mold taken through Fig. 1 at $x\ x$. Fig. 5 is a section of the mold taken through Fig. 4 at 5 5. Fig. 6 is a detailed view of Fig. 5. Fig. 7 is an elevation of the old way of making the top of the electrode.

The object of my invention is to cast the hole in which the wire connection is made at the top at the time the electrode is made, as shown in Fig. 2 at $o$. Fig. 7 shows the old method of making that portion of the top. This is done by taking a piece of brass rod and drilling a hole in it and placing it in the mold and pouring in the zinc. This is expensive.

I attain this object by the mechanism illustrated in the accompanying drawings.

Similar letters refer to similar parts throughout the several parts.

The mold is made in the usual form of such molds for casting electrodes; and it consists of a center piece, A, (see Figs. 1 and 4,) in which there is an opening formed in the shape of the bottom of electrode B, Fig. 2, and covers C C', which inclose the center piece when shut together, as shown in Fig. 1, C being shown in Fig. 4. The covers are opened and shut by handles $g'\ g'$. Both of these covers have a projection, D D', on the under side, and have in them depressions in the shape of the stem of the electrode shown at E. When the covers C and C' are closed, the depressions come in line with the proper end of the opening in the center piece, A, thus forming a perfect matrix, in shape of Fig. 2, to receive the metal.

Through the bottom end of the cover C and inside the depression E, I place a pin, $a$, Figs. 4, 5, and 6. This pin leaves a hole for the wire after the electrode is cast. The pin $a$ is held in a sustaining-bar, $b$. (Shown in Figs. 5 and 6 in full lines, and Fig. 4 in dotted lines.) In one end of the sustaining-bar a pin, $c$, is inserted, which passes into cover C, to hold it in place and form a guide. Two pins, $d$, are passed through the covers C', and are held together and in place by a connecting-bar, $e$. The object of these pins is to form a device for removing the pin $a$ when the casting is made. This is done by pressing on the bar $e$ until the pins $d\ d$ strike the bar $c$, and cause it to be moved back until the pin $a$ is clear of the casting and leaves a hole for the connecting-wire, as shown in Figs. 2 and 3. The electrode-wire $f$ is held rigidly in place in the top of electrode B in the opening $o$ by a metal key, $f'$, as clearly shown in Fig. 3.

What I claim, and am desirous of securing by Letters Patent, is—

1. In molds for casting electrodes, the removable pin $a$, in combination with the cover C C' and center piece, A, all adapted and arranged to operate as and for the purpose set forth.

2. In molds for casting electrodes, the removable pin $a$, guide-pin $c$, and connecting-bar $b$, in combination with the discharging-pins $d\ d$, all constructed and arranged to operate as and for the purposes set forth.

JOHN B. ODELL.

Witnesses:
JAS. LORENZO GAGE,
M. A. KNAPP.